United States Patent Office 3,580,953
Patented May 25, 1971

3,580,953
PREPARATION OF 3 - ENDO-METHYL - 3-EXO(4'-METHYL-5'-HYDROXYPENTYL) NORCAMPHOR FROM 2-METHYL-4-PENTENOL

Wayne I. Fanta and William F. Erman, Springfield Township, Hamilton County, Ohio, assignors to The Procter & Gamble Company, Cincinnati, Ohio
No Drawing. Filed Mar. 29, 1968, Ser. No. 717,362
Int. Cl. C07c 49/27
U.S. Cl. 260—586R    14 Claims

ABSTRACT OF THE DISCLOSURE

Process for preparing 3-endo-methyl-3-exo(4'-methyl-5'-hydroxypentyl)norcamphor from 2-methyl-4-pentenol comprising the steps of: (1) esterifying 2-methyl-4-pentenol; (2) hydrobrominating the ester in the presence of a free radical catalyst; (3) reducing the hydrobrominated ester to 2-methyl-5-bromopentanol; (4) borating the 2-methyl-5-bromopentanol with boric acid and/or boric anhydride to obtain tri(2-methyl-5-bromopentyl)borate; and (5) alkylating 3-methylnorcamphor with the tri(2-methyl-5-bromopentyl)borate and, subsequently, hydrolyzing the reaction product to obtain 3-endo-methyl-3-exo-(4'-methyl-5'-hydroxypentyl) norcamphor.

FIELD OF THE INVENTION

This invention relates to a process for obtaining 3-endo-methyl-3-exo(4'-methyl - 5' - hydroxypentyl)norcamphor which is useful in synthesizing dihydro-β-santalol, a compound having a valuable sandalwood odor. More specifically, this invention relates to the preparation of 3-endo-methyl-3-exo(4'-methyl - 5' - hydroxypentyl)norcamphor from 2-methyl-4-pentenol. The 2-methyl-4-pentenol, protected as an ester, is hydrobrominated through a free radical, anti-Markownikoff, addition and subsequently reduced to the alcohol. The alcohol is protected as the borate, and subsequently used in alkylating 3-methylnorcamphor and then hydrolyzed to obtain 3-endo-methyl-3-exo(4'-methyl-5'-hydroxypentyl)norcamphor.

HISTORY OF THE INVENTION

East Indian sandalwood oil has heretofore been available only from East Indian sandalwood trees. This oil and various individual components of the oil are highly valued perfume bases and are used in large quantities throughout the perfume industry. The oil, however, is expensive and is in limited and sometimes sporadic supply. For this reason, a continuous effort has been made to synthesize various components of the oil or similar synthetic materials which possess the desirable, powerful woody fragrance of sandalwood oil.

This invention relates to a method of obtaining 3-endo-methyl-3-exo(4'-methyl - 5' - hydroxypentyl)norcamphor which is a valuable intermediate in the synthesis of dihydro-β-santalol, a perfume compound having a desirable sandalwood fragrance. Other processes and intermediate compounds relating to the synthesis of dihydro-β-santalol and the novel compound, dihydro-β-santalol, are described in the following copending applications which were filed simultaneously herewith: Fanta and Erman, 3-endo-methyl-3-exo(4'-methyl - 5' - hydroxypentyl)norcamphor, and 2-methyl-5-bromopentanol, and Process for the Preparation of These Compounds, Ser. No. 717,360, filed Mar. 29, 1968; Fanta and Erman, Tetrahydropyranyl Ether Compounds and Process for the Preparation of These Compounds and 3 - endo-methyl - 3 - exo(4'-methyl-5'-hydroxypentyl)norcamphor, Ser. No. 717,384, filed Mar. 29, 1968; Fanta and Erman, Preparation of 3-endo-methyl-3-exo(4'-methyl - 5' - hydroxypentyl)norcamphor from 2-methyl-4-pentenol, Ser. No. 717,374, filed Mar. 29, 1968; Fanta and Erman, Dihydro-β-santalol and Process for Preparing Dihydro-β-santalol from 3-endo-methyl-3-exo-(4'-methyl-5'-hydroxypentyl)norcamphor, Ser. No. 717,458, filed Mar. 29, 1968.

SUMMARY OF THE INVENTION

The present invention describes a process for preparing 3-endo - methyl - 3 - exo(4' - methyl - 5' - hydroxypentyl) norcamphor from 2-methyl-4-pentenol. The process of this invention comprises the steps of:

(1) Esterifying 2-methyl-4-pentenol having the general formula

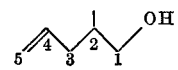

to obtain the ester of 2-methyl-4-pentenol having the general formula

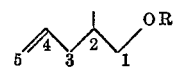

wherein R is an acyl group containing from 2 to about 5 carbon atoms;

(2) Hydrobrominating the ester of Step 1 with hydrogen bromide in the presence of a catalytic amount of a free radical catalyst to obtain a 2-methyl-5-bromopentyl ester having the general formula

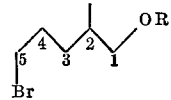

(3) Reducing the hydrobrominated ester of Step 2 with a reducing agent to obtain 2-methyl-5-bromopentanol having the general formula

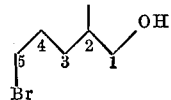

(4) Borating the 2-methyl-5-bromopentanol with a compound selected from the group consisting of boric acid, boric anhydride, and mixtures thereof to obtain tri-(2-methyl-5-bromopentyl)borate having the general formula

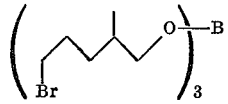

(5) Reacting tri(2-methyl-5-bromopentyl)borate with a mixture prepared from 3-methylnorcamphor having the general formula

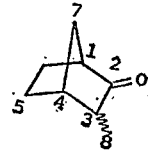

and a strong base and subsequently hydrolyzing the reaction product to obtain 3-endo-methyl-3-exo(4'-methyl-5'-hydroxypentyl)norcamphor having the general formula

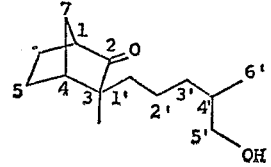

3-endo-methyl-3-exo(4' - methyl - 5' - hydroxypentyl) norcamphor has utility as a valuable perfume compound and as an intermediate in the synthesis of dihydro-β-santalol.

DESCRIPTION OF THE PRODUCTS AND PROCESS

The initial starting compound for this process, 2-methyl-4-pentenol, is known and can be obtained by several different methods. One method comprises reacting diethyl malonate with methyl bromide in the presence of a base to obtain diethyl methylmalonate. Diethyl methylmalonate is reacted with allyl chloride in a base catalyzed alkylation reaction to obtain diethyl methylallylmalonate. This compound is saponified with a base to obtain the salt, and then the salt is reacted with an acid to obtain the dicarboxylic acid. Heat is applied to the dicarboxylic acid at reduced pressures to obtain the monocarboxylic acid which is subsequently reduced to 2-methyl-4-pentenol with lithium aluminum hydride. This synthesis is generally described in Allen et al., 2-Methylenedodecanoic Acid, Organic Synthesis, 38, pp. 47–51 (1958) and Fray et al., Constituents of the Lipids of Tubercle Bacilli. Part VII. Synthesis of (+)-2(L): 4-Dimethyldocosanoic Acid, an Oxidation Production of Mycolipenic Acid, Journal of the Chemical Society, pp. 2036–41 (1956).

A second method of obtaining 2-methyl-4-pentenol is set forth in Cherest et al., Addition of Grignard Reagents to the Double Bond of Allylic Alcohols, Tetrahedron Letters, No. 8, pp. 875–879 (1966). This reference discloses reacting 2.5 moles of allyl magnesium bromide with 1 mole of allyl alcohol to obtain 2-methyl-4-pentenol.

Another novel and less expensive way of obtaining 2-methyl-4-pentenol is described in Fanta and Erman, 3-endo-Methyl-3-exo(4' - methyl - 5' - hydroxypentyl)norcamphor and 2-methyl-5-bromopentanol, and Process for the Preparation of These Compounds, Ser. No. 717,360, filed Mar. 29, 1968, at pages 6–7. (This disclosure is incorporated herein by reference.)

The first step of this process comprises esterifying 2-methyl-4-pentenol having the general formula

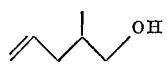

to obtain the ester of 2-methyl-4-pentenol having the general formula

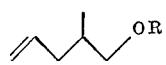

wherein R is an acyl group containing from 2 to about 5 carbon atoms. General methods of esterifying alcohols are well known and are described in Cram and Hammond, "Organic Chemistry," (McGraw-Hill, 2nd ed., 1964) at pp. 92–94, 358–360 (these pages are incorporated herein by reference). These methods include treating alcohols with acids, acid halides and acid anhydrides. A preferred method of forming an ester of 2-methyl-4-pentenol comprises dissolving 2-methyl-4-pentenol in a solvent and adding acetic anhydride thereto. The acetic anhydride is utilized in this step in a molar ratio of 2-methyl-4-pentenol to acetic anhydride of from about 1:1 to about 1:5 with about 1:3 being preferred. Examples of suitable solvents for use herein include pyridine, collidine, trimethylamine, triethylamine. Pyridine is the preferred solvent.

The esterification reaction is facile in the atmosphere at ordinary room temperatures in from about 12 to about 36 hours. The time required for the reaction to reach completion is dependent on a number of factors, e.g., concentration of reactants, temperature of the reaction mixture and amount of solvent utilized. The temperature at which the esterification reaction is run is not critical providing extremely high or extremely low temperatures are not utilized, e.g., 0° C. to 50° C. In order to prevent the formation of by-products, the reaction is, preferably, run in an oxygen-free, inert atmosphere, e.g., nitrogen or argon.

2-methyl-4-pentenyl acetate can be recovered from the above described reaction mixture in relatively pure form by adding water or an aqueous solution of a salt, for example, sodium chloride, to the reaction mixture. The 2-methyl-4-pentenyl acetate is then extracted with ether. Any solvent, e.g., pyridine, remaining with the 2-methyl-4-pentenyl acetate can be removed by washing the product with a dilute acid solution. The excess acid is removed from the 2-methyl-4-pentenyl acetate by washing with water or an aqueous solution of a salt, for example, sodium bicarbonate or sodium chloride. The ether solution of 2-methyl-4-pentenyl acetate is then dried by conventional means, for example, with magnesium sulfate. Removal of the solvent by distillation, preferably at reduced pressure, affords 2-methyl-4-pentenyl acetate which can be further purified by distillation at reduced pressure.

The second step of this process comprises hydrobrominating the ester of 2-methyl-4-pentenol with hydrogen bromide, preferably in gaseous form, in the presence of a catalytic amount of a free radical catalyst to obtain a 2-methyl-5-bromopentyl ester having the general formula

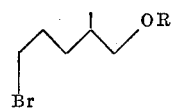

Although a solvent is not required in the hydrobromination of the 2-methyl-4-pentenyl ester, and aprotic solvent, i.e., a solvent which contains no readily available acidic protons, is generally and preferably utilized in this step. Among the aprotic solvents suitable for use herein are hexane, pentane, cyclohexane, methylene chloride, diethyl ether, carbon tetrachloride, benzene, toluene and xylene. The aprotic solvent generally comprises from about 20% to about 99% by weight of the reaction mixture of Step 2.

Free radical catalysts suitable for use herein are well known and are discussed in Sosnovsky, "Free Radical Reactions in Preparative Organic Chemistry," pp. 6–11, MacMillan, New York (1964). These catalysts include peroxides, ozonides, thermally labile azo compounds, haloketones, and ketones and tetraethyl lead in the presence of ultraviolet light.

Hydrogen bromide is bubbled through a reaction mixture comprising the 2-methyl-4-pentenyl ester of Step 1, an aprotic solvent, and a free radical catalyst to obtain an ester of 2-methyl-5-bromopentanol. Although only one mole of hydrogen bromide is theoretically required to react with one mole of the 2-methyl-4-pentenyl ester, the hydrogen bromide is generally introduced in large excess, e.g., 1 to 30 moles of hydrogen bromide per mole of 2-methyl-4-pentenyl ester. The excess hydrogen bromide can be recycled through the reaction mixture. It is preferred that the hydrobromination reaction be run at low temperatures, i.e., from about —30° C. to about 45° C., preferably from about —10° C. to about 20° C. The low temperatures facilitate free radical, anti-Markownikoff, adddition, i.e., formation of primary bromides, and impede ionic addition, i.e., formation of secondary bromides. The reaction mixture is washed with dilute base solution (sodium carbonate, sodium bicarbonate, sodium hydroxide) and then with brine until neutral to remove the free radical catalyst and any hydrogen bromide in the reaction mixture to prevent formation of secondary reaction products. The reaction mixture is then dried and the aprotic solvent can be removed, e.g., by distillation, from the mixture leaving the ester of 2-methyl-5-bromopentanol as a residual oil.

The third step of this process comprises reducing the hydrobrominated ester of Step 2 with a reducing agent to obtain 2-methyl-5-bromopentanol having the general formula

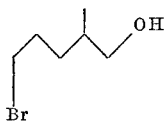

This reduction step can be accomplished with a number of solvents and a variety of reducing agents. Generally the reducing agents used herein are dissolved in a suitable solvent for use herein is diethyl ether. The solvent is utilized ethane or bis(2-methoxyethyl)-ether. The preferred solvent for use herein is diethyl ether. The solvent is utilized in amounts sufficient to dissolve the ester of 2-methyl-5-bromopentanol and to provide a reaction medium. The solvent generally comprises from about 75% to about 98% of the reaction medium of Step 3.

Examples of suitable and preferred reducing agents include lithium aluminum hydride, lithium borohydride and diborane. The preferred reducing agent for use herein is lithium aluminum hydride which is preferably modified by the addition of aluminum chloride to minimize reduction of the primary bromide.

In this preferred embodiment, the reducing properties of lithium aluminum hydride are modified by the addition of aluminum chloride in a molar ratio of lithium aluminum hydride to aluminum chloride of from about 0.9:1 to about 1:0.9, preferably in a molar ratio of 1:1. In preparing this modified reducing agent, a solvent, preferably diethyl ether, is added slowly and cautiously to the aluminum chloride to prevent evolution of great amounts of heat. This solution is cooled to about room temperature and added to lithium aluminum hydride suspended in a solvent, preferably diethyl ether. Preparation of this modified lithium aluminum hydride should be accomplished in an anhydrous atomsphere.

The reducing agents described above are used in a molar ratio of reducing agent to ester of 2-methyl-5-bromopentanol of from about 0.5:1 to about 2:1, preferably about 1:1.

In this third step of this process, a reaction mixture comprising the ester of 2-methyl-5-bromopentanol, a reducing agent and a solvent in the above described proportions is prepared. The reducing agent, suspended in the solvent, is placed in an reaction flask. The 2-methyl-5-bromopentyl ester, dissolved in solvent, is added to the reducing agent solution and an exothermic reaction immediately begins. The ester, dissolved in solvent, can advantageously be added at such a rate as to maintain a gentle reflux (usually about 10 minutes to about 20 minutes). The reaction mixture is stirred for from about 30 minutes to about 2 hours at room temperature. The reaction product is then hydrolyzed to obtain 2-methyl-5-bromopentanol by cautiously adding water to the reaction mixture. An aqueous solution of a strong acid, e.g., sulfuric acid, is added to dissolve some of the lithium and aluminum salts. The mixture is extracted with, for example, ether, and washed with water or an aqueous solution of, for example, sodium bicarbonate or sodium chloride. The remaining ether solution of the 2-methyl-5-bromopentanol is then dried, e.g. with magnesium sulfate, to obtain 2-methyl-5-bromopentanol.

In the fourth step of this process, the 2-methyl-5-bromopentanol is borated with boric acid and/or boric anhydried in a suitable solvent. The hydroxyl functional group of the 2-methyl-5-bromopentanol is thereby protected in the subsequent alkylation reaction. Without protection of the hydroxyl group, undesired by-products are obtained in the subsequent alklation step.

A reaction mixture comprising 2-methyl-5-bromopentanol, boric acid and/or boric anhydride and a solvent which forms an azeotrope with water is prepared. The boric acid and/or boric anhydride is preferably used in this reaction mixture in a molar ratio of 2-methyl-5-bromopentanol to boric acid of about 3:1 and 2-methyl-5-bromopentanol to boric anhydride of about 6:1. Boric acid and/or boric anhydride can be used herein in amounts more than or less than the amounts specified. However, if excess boric acid and/or boric anhydride is utilized in the reaction, it must be removed from the reaction mixture in an additional purifying step. If less than the amount specified is utilized herein, a portion of the 2-methyl-5-bromopentanol will not be protected in the subsequent alkylation step of this process.

The solvent used in this step forms an azeotrope with water and, preferably, is less dense than water. Typical examples of solvents meeting this definition are benzene, toluene and xylene. Benzene and toluene are the preferred solvents for use herein. Generally, the solvent comprises from about 20% to about 99% of the reaction mixture.

This reaction mixture comprising 2-methyl-5-bromopentanol, boric acid and/or boric anhydride and the azeotropic solvent is allowed to react at elevated temperatures ranging from about 30° C. to about 150° C., e.g., generally at solvent reflux temperatures. As the boric acid and/or boric anhydride reacts with the 2-methyl-5-bromopentanol, water is formed. When the theoretical amount of water obtainable from the reaction of 2-methyl-5-bromopentanol and boric acid and/or boric anhydride is formed, heating is discontinued. The resulting mixture contains tri(2-methyl-5-bromopentyl)borate and the solvent. The solvent can then be removed by any convenient method, e.g., by distillation, preferably at reduced pressures, to obtain an extremely viscous oil, tri(2-methyl-5-bromopentyl)borate. Solvent removal is not necessary, however, as the subsequent alkylation reaction can be conducted directly in the azeotropic solvent, preferably benzene or toluene.

It is preferable in the above described borating step to use apparatus similar to the Dean-Stark water trap in order to facilitate removal and measurement of the water formed during the reaction. For examples and methods of utilizing this apparatus, see Wiberg, "Laboratory Techniques in Organic Chemistry," pp. 214–217, McGraw-Hill Book Company, Inc., New York (1960) and Dean et al., "A Convenient Method for the Determination of Water in Petroleum and Other Organic Emulsions," The Journal of Industrial and Engineering Chemistry, 12, pp. 486–490 (May 1920).

In the fifth step of this reaction, the tri(2-methyl-5-bromopentyl)borate is treated with a mixture prepared from 3-methylnorcamphor, a strong base and a solvent and, subsequently, the reaction product thereof is hydrolyzed to obtain 3-endo-methyl - 3 - exo(4' - methyl-5'-hydroxypentyl)norcamphor having the following general formula

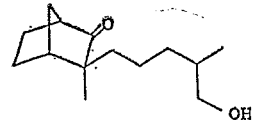

A process for preparing 3-methylnorcamphor is described in Corey et al., The Synthesis of dl-β-santalene and dl-epi-β-santalene by Stereospicific Routes, J. Am. Chem. Soc., 84, p. 2611 (1962). The endo or the exo isomers of 3-methylnorcamphor or mixtures of these isomers can be used.

Suitable strong bases and suitable solvents for use with 3-methylnorcamphor are described in House, "Modern Synthetic Reactions," p. 185, Benjamin, New York (1965). In this part of the fifth step, the base-solvent system should possess a relative basicity of $pK_a$ equal to or greater than the $pK_a$ of hydroxyl ion in aprotic solvents. It is preferred that the $pK_a$ of the base-solvent system be greater than the $pK_a$ of hydroxyl ion in aprotic solvents. The strong bases suitable for use herein include potassium-t-butoxide, sodium-t-amylate, sodium amide, potassium amide, sodium hydride, lithium hydride, dimethyl sulfoxide anion, sodium or potassium or lithium triphenyl methide and sodium naphthalenide. Solvents commonly used with these strong bases include benzene, toluene, xylene, tetrahydrofuran, and diethyl ether. Strong bases preferred for use herein are sodium amide and sodium hydride; preferred solvents are benzene, toluene, xylene and tetrahydrofuran.

The mixture of 3-methylnorcamphor, strong base and solvent should contain 3-methylnorcamphor and strong base in a molar ratio of about 1:1. An excess of either component can be used; however, that excess does not aid the reaction and adds to the total cost. Therefore, excess amounts of these components are generally not used. The amount of solvent used in this mixture is not critical. Generally, the solvent comprises from about 75% to about 95% by weight of the mixture.

This mixture is then heated to form the enolate of 3-methylnorcamphor which has the following general formula (sodium is utilized as a representative cation).

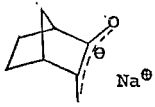

Formation of the enolate generally requires heating of the mixture at temperatures ranging from 50° C. to 130° C. for from about 1 to about 8 hours during which time hydrogen gas is evolved from the reaction mixture. When the theoretical amount of hydrogen gas is evolved, the formation of the enolate is completed. The time required for forming the enolate varies as enolate formation is, of course, dependent upon concentration of the components, amount of solvent utilized, and the intensity of the heat source.

This mixture containing the enolate of 3-methylnorcamphor and the solvent is then treated with the tri(2-methyl-5-bromopentyl)borate obtained from Step 4 in a molar ratio, the enolate of 3-methylnorcamphor (i.e., 3-methylnorcamphor originally in the mixture) to tri(2-methyl-5-bromopentyl)borate of about 3:1. Again, excess amounts of either component can be used in this reaction, however, the excess amount does not enter into the reaction and must be removed from the final product or tolerated as an impurity.

The reaction mixture containing the enolate and the borate is maintained at elevated temperatures ranging from about 50° C. to about 150° C., usually at the reflux temperature of the solvent being utilized, for from about 24 to about 120 hours to obtain a methylnorcamphor alkyl borate compound. In order to hydrolyze the borate linkage and obtain the novel compound, 3-endo-methyl-3-exo-(4'-methyl-5'-hydroxypentyl)norcamphor, the reaction mixture is cooled and water is added with agitation to the reaction mixture. Agitation of the mixture is continued, generally for from about 10 to about 60 minutes. On standing, the water layer separates from the reaction mixture; the water layer is then removed. To obtain maximum yields of 3-endo-methyl-3-exo-(4' - methyl - 5' - hydroxypentyl)norcamphor the water can be extracted with ether and the ether extract added to the solvent mixture. The reaction mixture is dried by ordinary methods, e.g., an inorganic drying compound such as magnesium sulfate, and then the solvent is removed, e.g., by distillation, preferably, at reduced pressures. The final product is 3-endo - methyl-3-exo(4'-methyl-5'-hydroxypentyl)norcamphor, a colorless, viscous oil.

3-endo - methyl-3-exo(4'-methyl-5'-hydroxypentyl)norcamphor has a highly desirable and useful odor characterized as a sweet, fruity (strawberry, pineapple, melon, berry, apple), floral note. This compound can be used individually as an odorant per se or this compound can be used as a component of perfume compositions for ultimate use in products such as soaps, detergents, deodorants, food products, and the like. Perfume compositions containing odoriferously effective amounts, e.g. 0.0001% to about 50% of 3-endo-methyl-3-exo(4'-methyl-5'-hydroxypentyl)norcamphor, are desirable and useful. More specific illustrations of the perfume utility of this compound are found in Examples II and III hereinafter.

3-endo - methyl-3-exo(4'-methyl-5'-hydroxypentyl)norcamphor is also a useful intermediate in the synthesis of dihydro-β-santalol. Its use as an intermediate in this capacity is detailed in Fanta and Erman, dihydro-β-santalol and Process for Preparing Dihydro-β-santalol from 3-endo - methyl-3-exo(4'-methyl-5'-hydroxypentyl)norcamphor, Ser. No. 717,458, filed Mar. 29, 1968. This copending application is incorporated herein by reference.

EXAMPLES

The following examples illustrate specific preferred embodiments of this invention and are not intended to be limiting. All percentages and ratios in the following examples as well as in the specification and in the appended claims are by weight unless otherwise indicated. Temperatures are expressed in degree centigrade.

Data listed in all of the examples were obtained by means of the following techniques unless otherwise indicated. The apparatus described by Johnson et al., "β-carbethoxy - γ,γ - Diphenylvinylacetic Acids," Organic Syntheses, 30, p. 18 (1950), was used to maintain a nitrogen atmosphere. Infrared spectra were determined on a Perkin-Elmer Model 137 Spectrophotometer; ultraviolet spectra were determined in ethanol on a Perkin-Elmer Model 202 Spectrophotometer. Nuclear magnetic resonance (N.M.R.) spectra were determined in carbon tetrachloride with a Varian Model HA–100 Spectrometer with chemical shifts measured relative to tetramethylsilane ($10\tau$). The N.M.R. data are noted by chemical shift, integration, multiplicity, coupling constant (in Hz.), and assignment. Gas-liquid chromatography was accomplished with an Aerograph Model 202B using a flow rate of 100 ml./min. of 5-ft. by 0.25-in. columns packed with (A) 20% FFAP (Carbowax 20 M terminated with nitroterephthalic acid) on 60/80 mesh Chromosorb P or (B) 20% SE 30 (a methyl silicone gum rubber compound) on 60/80 mesh Chromosorb W.

EXAMPLE I

Preparation of 3-endo-methyl-3-exo(4'-methyl-5'-hydroxypentyl)norcamphor from 2-methyl-4-pentenol (1) Preparation of 2-methyl-4-pentenyl acetate from 2-methyl-4-pentenol (Step 1).—A dry 100 ml. flask was charged with a solution of 3.44 g. (0.0344 mole) of 2-methyl-4-pentenol in 35 ml. of anhydrous pyridine. A nitrogen atmosphere was introduced and 10.78 g. (0.105 mole) (10 ml.) of acetic anhydride was added under a positive nitrogen pressure. After stirring for 24 hours at room temperature, the reaction was added to brine and the product was isolated with diethyl ether. The pyridine was removed with several 3% aqueous hydrochloric acid washes. The ether extracts were then washed with brine and dried over magnesium sulfate. The ether was removed to afford a crude oil which on distillation gave 4.30 g. (88%) of colorless 2-methyl-4-pentenyl acetate, B.P. 60–65° (15 mm.) which showed 99% purity by gas-liquid partition chromatography. Material purified by further distillation had the following characteristics: B.P. 54–56° (15 mm.), exhibited $n_D^{26}$ 1.4140

$\lambda_{max.}^{film}$ 3.28, 5.71, 6.10, 8.06, 9.62, 10.05, 10.91$\mu$

N.M.R. signals at $\tau$ 4.10–4.55 (1H, —CH=), 4.90–5.19 —CHCH$_2$—, OAc), 9.11 (3H, doublet, J=6 Hz., CHCH$_3$).

Analysis.—Calculated for $C_8H_{14}O_2$ (percent): C, 67.57; H, 9.93. Found (percent): C, 67.30; H, 9.96.

Results substantially similar to those achieved in Paragraph 1 are obtained when the following solvents are substituted for pyridine on an equal weight basis: collidine, trimethylamine and triethylamine. Substantially similar results are also obtained when the following compounds are substituted for acetic anhydride in esterifying 2-methyl-4-pentenol: acetyl bromide, acetyl chloride, propionyl bromide, propionyl chloride, valeryl bromide, butyryl chloride, propionic anhydride, acetic propionic anhydride, butanoic anhydride, and acetic butanoic anhydride. 2-methyl-4-pentenol can also be esterified by utilizing acetic acid, propionic acid or butanoic acid plus a trace of any Lewis acid.

(2) Preparation of 2-methyl-5-bromopentyl acetate from 2-methyl-4-pentenyl acetate (Step 2).—A dry, 250 ml. flask fitted with a subsurface gas inlet and reflux condenser was charged with a solution of 12.84 g. (0.09 mole) of 2-methyl-4-pentenyl acetate in 100 ml. of hexane and 222 mg. (0.9 mm.) of benzoyl peroxide. The mixture was cooled to 0° and excess anhydrous hydrogen bromide gas, ca. 0.9 mole, was passed in rapidly over a 15 minute period. The reaction mixture was stirred for an additional 15 minutes. The excess gas was removed by a nitrogen sweep, and the total solution was washed with a saturated aqueous solution of sodium bicarbonate and then brine until the pH of the reaction mixture was about 7. The reaction mixture was dried with magnesium sulfate and the dried hexane was removed by distillation. The reaction product remaining was crude 2-methyl-5-bromopentyl acetate which on distillation gave 17.37 g. (85%) of product, B.P. 69–72° (0.85 mm.). Further purification by distillation, B.P. 69–71° (0.9 mm.), and gas-liquid chromatography gave an oil exhibiting $n_D^{33}$ 1.4533, $$\lambda_{max.}^{film} \ 5.73, 8.10, 9.63\mu$$

N.M.R. signals at $\tau$ 6.14 (1H, doublet, J=6.5 Hz., CH$_2$OAc), 6.63 (2H, triplet, J=7 Hz., CH$_2$Br), 8.03 (3H, OAc), 9.06 (3H, doublet, J=6.5 Hz., CHCH$_3$). Reported for 2-methyl-5-bromopentyl acetate $n_D^{33}$ 1.4539, B.P. 77° (3 mm.).

Analysis.—Calculated for C$_8$H$_{15}$BrO$_2$ (percent): C, 43.06; H, 6.78; Br, 35.82. Found (percent): C, 43.04; H, 6.75; Br, 35.78.

Results substantially similar to those achieved in Paragraph 2 are obtained when the following solvents are substituted for hexane on an equal weight basis: pentane, cyclohexane, methylene chloride, diethyl ether, carbon tetrachloride, benzene, toluene and xylene. Substantially similar results are also obtained when the following free radical catalysts, in a catalytic amount, are substituted for benzoyl peroxide: ozone, oxygen, t-butyl peroxide, acetyl peroxide, ascaridole, azotriphenylmethane, bromoacetone, and compounds such as acetone and tetraethyl lead in the presence of ultraviolet light.

(3) Preparation of 2-methyl-5-bromopentanol from 2-methyl-5-bromopentyl acetate (Step 3).—A dry 250 ml. flask fitted with septum, reflux condenser and drying tube was charged with 950 mg. (0.025 mole) of lithium aluminum hydride and 25 ml. of anhydrous diethyl ether. An aluminum chloride-ether complex prepared by cautiously adding 38 ml. of anhydrous diethyl ether to 3.33 g. (0.025 mole) of aluminum chloride was added to the flask followed by a solution of 5.53 g. (0.025 mole) of 2-methyl-5-bromopentyl acetate in 50 ml. of anhydrous diethyl ether. The 2-methyl-5-bromopentyl acetate solution was added over 15 minutes at a rate sufficient to maintain the reaction mixture at gentle reflux. The reaction mixture was stirred at room temperature for one hour at which time 9 ml. of water was cautiously added to the reaction mixture followed by 35 ml. of 6 N aqueous sulfuric acid in 25 ml. of water. The resulting mixture was extracted with ether and the combined ether extracts were washed once with brine. The ether extracts were dried with magnesium sulfate and the dried solvent was removed. A crude yellow oil remained which on distillation gave 4.18 g. (94%) of clear 2-methyl-5-bromopentanol, B.P. 65–65.5° (0.04 mm.) which showed 97% purity by gas-liquid partition chromatography. Redistillation B.P. 62° (0.02 mm.), gave material exhibiting $n_D^{25}$ 1.4829, $$\lambda_{max.}^{film} \ 2.99, 9.68\mu$$

N.M.R. signals at $\tau$ 4.30 (1H, OH), 6.59 (2H, doublet, J=7 Hz., CH$_2$OH), 6.61 (2H, triplet, J=6.5 Hz., CH$_2$Br), 9.05 (3H, doublet, J=6 Hz., CHCH$_3$).

Analysis.—Calculated for C$_6$H$_{13}$BrO (percent): C, 37.79; H, 7.23; Br, 44.14. Found (percent): C, 39.90; H, 7.23; Br, 44.07.

Results substantially similar to those achieved in Paragraph 3 are obtained when the following solvents are substituted for diethyl ether on an equal weight basis: tetrahydrofuran, 1,2-dimethoxyethane, and bis(2-methoxyethyl) ether. Substantially similar results are also obtained when the following reducing agents are substituted for the lithium aluminum hydride-aluminum chloride reducing mixture on an equimolar basis: lithium borohydride, diborane and lithium aluminum hydride.

(4) Preparation of tri(2-methyl-5-bromopentyl)borate from 2-methyl-5-bromopentanol (Step 4).—A 500 ml. flask fitted with a Dean-Stark trap and condenser was charged with a solution of 18 g. (0.1 mole) of crude 2-methyl-5-bromopentanol in 200 ml. of benzene and 2.10 g. (ca. 0.033 mole) of boric acid. The reaction mixture was refluxed under nitrogen until the theoretical amount of water had collected. The solution was cooled slightly and the benzene was removed at reduced pressure to afford 18.82 g. of crude tri(2-methyl-5-bromopentyl)borate. The product had the following characteristics:

$$\lambda_{max.}^{film} \ 6.75, 7.05, 7.48, 9.68\mu$$

N.M.R. signals at $\tau$ 6.38 (2H, doublet, J=6 Hz., CH$_2$OH), 6.63 (2H, triplet, J=7 Hz., CH$_2$Br), 9.10 (3H, doublet, J=7 Hz., CHCH$_3$). This material was used directly in Step 5 without further purification.

Results substantially similar to those achieved in Paragraph 4 are obtained when 0.0167 mole of boric anhydride are substituted for the 0.033 mole of boric acid in that the hydroxyl groups of the 2-methyl-5-bromopentanol are protected in the subsequent step of this process. Substantially similar results are also obtained when toluene and xylene are substituted for benzene on an equal weight basis.

(5) Preparation of 3-endo-methyl-3-exo(4'-methyl-5'-hydroxypentyl)norcamphor from tri(2-methyl-5-bromopentyl)borate (Step 5).—A 500 ml. flask fitted with a condenser and addition funnel was charged with 4.9 g. (0.125 mole) of a 61% mineral oil dispersion of sodium hydride. A nitrogen atmosphere was introduced along with 60 ml. of toluene (redistilled). A solution of 12.4 g. (0.1 mole) of 3-methylnorcamphor in 60 ml. of dry toluene was added and enolate formation proceeded over 2.25 hr. at 130°. The refluxing enolate mixture was treated as rapidly as possible with a solution of 18.82 g. (ca. 0.034 mole) of crude tri(2-methyl-5-bromopentyl)borate in 60 ml. of dry toluene. The reaction was stirred rapidly at reflux for an additional 68 hr., cooled, and added to brine. The product was isolated with ether and the combined extracts were washed with brine and dried over magnesium sulfate. Solvent removal afforded crude oil which on distillation gave 13.87 g. (62%) of 3-endo-methyl-3-exo(4'-methyl - 5' - hydroxypentyl)norcamphor, B.P. 117–130° (0.08 mm.) which showed 90% purity by gas-liquid partition chromatography. This material, after redistillation, had the following characteristics: B.P. 127–130° (0.07 mm.), and gas-liquid partition chromatography gave 3-endo-methyl - 3 - exo(4'-methyl - 5' - hydroxpentyl) norcamphor exhibiting $$\lambda_{max.}^{film} \ 2.90, 5.73, 7.30, 9.60, 10.92, 13.02\mu$$

N.M.R. signals at $\tau$ 6.68 (2H, doublet, J=6 Hz., CH$_2$OH), 7.01 (1H, OH), 7.51, 7.65 (2H, C$_1$—H, C$_4$—H), 9.01 (3H, CH$_3$), 9.08 (3H, doublet, J=6.5 Hz., CHCH$_3$).

Analysis.—Calculated for C$_{14}$H$_{24}$O$_2$ (percent): C, 74.95; H, 10.78. Found (percent): C, 74.81; H, 10.83.

Results substantially similar to those achieved in paragraph 5 are obtained when the following strong bases are substituted for sodium hydride: potassium-t-butoxide, sodium-t-amylate, sodium amide, potassium amide, lithium hydride, dimethyl sulfoxide anion, sodium triphenyl methide, and sodium naphthalenide. Substantially similar results are also obtained when the following solvents are substituted for toluene: benzene, xylene, and tetrahydrofuran.

The 3-endo-methyl - 3 - exo(4' - methyl - 5' - hydroxypentyl)norcamphor isolated above was a colorless viscous oil having an odor characterized as a sweet, fruity (strawberry, pineapple, melon, berry, apple), floral note. This odor characteristic is useful in a wide variety of perfume compositions.

EXAMPLE II

Perfume compositions

Perfume compositions containing 3 - endo-methyl-3-exo(4'-methyl - 5' - hydroxypentyl)norcamphor are prepared by intermixing the components shown below. The compositions exhibit highly desirable and useful odors.

Composition A.—Strawberry base

| Components: | Percent by weight |
|---|---|
| 3-endo-methyl-3-exo(4'-methyl - 5' - hydroxypentyl)norcamphor | 10 |
| Ethyl acetate | 30 |
| Ethyl benzoate | 3 |
| Ethyl butyrate | 20 |
| Ethyl nitrate | 10 |
| Ethyl pelargonate | 5 |
| Ethyl formate | 10 |
| Amyl acetate | 4 |
| Benzyl acetone | 3 |
| Methyl naphthyl ketone | 1 |
| Methyl salicylate | 2 |
| Cinnamon oil | 1 |
| Coumarin | 1 |
| | 100 |

Composition B.—Pineapple base

| Components: | Percent by weight |
|---|---|
| Amyl butyrate | 50 |
| Ethyl butyrate | 20 |
| Ethyl acetate | 5 |
| Acetaldehyde | 6 |
| Chloroform | 5 |
| Lemon oil | 2 |
| 3-endo-methyl - 3 - exo(4'-methyl-5'-hydroxypentyl)norcamphor | 1 |
| Propyl valerinate | 10 |
| Vanillin | 1 |
| | 100 |

The components and proportions in the perfume compositions of this example can be adjusted according to methods well known in the perfume art to form a wide variety of desirable perfume compositions containing odoriferously effective amounts of these compounds.

EXAMPLE III

Soap bar composition

A conventional household soap bar having the following composition is prepared:

| Component: | Percent by weight |
|---|---|
| Sodium soap | 75.0 |
| Potassium soap (The total soap comprises a mixture of 80% tallow soap and 20% coconut soap) | 7.5 |
| Water | 15.0 |
| Perfume Composition A of Example II | 2.5 |
| | 100.0 |

This soap bar exhibits a desirable strawberry fragrance. Composition B can be substituted for Composition A in the above soap bar composition to attain a pineapple fragrance.

What is claimed is:
1. Process for preparation of 3-endo-methyl-3-exo-(4'-methyl - 5' - hydroxypentyl)norcamphor from 2-methyl-4-pentenol comprising the steps of
   (1) esterifying 2-methyl-4-pentenol to obtain the ester of 2-methyl-4-pentenol having the formula

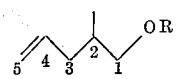

wherein R is a hydrocarbon acyl group containing from 2 to about 5 carbon atoms;
   (2) hydrobrominating the ester of Step 1 with hydrogen bromide in the presence of a catalytic amount of a free radical catalyst which is not irreversibly reactive with said ester nor hydrogen bromide and is selected from the group consisting of oxygen, peroxides, ozonides, thermally labile azo compounds, haloketones and ketones and tetraethyl lead in the presence of ultraviolet light and at a ratio of hydrogen bromide to 2-methyl - 4 - pentenol of 1:1 to 30:1 to obtain a 2 - methyl - 5 - bromopentyl ester;
   (3) reducing the hydrobrominated ester of Step 2 with a reducing agent followed by hydrolysis to obtain 2-methyl - 5 - bromopentanol wherein the reducing agent is selected from the group consisting of lithium aluminum hydride, lithium borohydride, diborane and lithium aluminum hydride modified with aluminum chloride in a ratio of lithium aluminum hydride to aluminum chloride of from about 0.9:1 to about 1:0.9 wherein the molar ratio of reducing agent to said ester is from about 0.5:1 to about 2:1 and wherein the reaction is carried out in a solvent which is not reactive to said ester, said pentanol nor to said reducing agent and the solvent is utilized in sufficient quantity to dissolve said ester and to provide a reaction medium;
   (4) borating the 2 - methyl - 5 - bromopentanol with a boron compound selected from the group consisting of boric acid, boric anhydride, and mixtures thereof to obtain tri(2-methyl - 5 - bromopentyl)-borate, wherein the reaction is conducted at a temperature of from about 30° C. to about 150° C. and in a solvent which forms an azeotrope with water and which is not reactive to said pentenol nor to said boron compound;
   (5) preparing a mixture of 3 - methylnorcamphor, a a strong base selected from the group consisting of potassium-t-butoxide, sodium-t-amylate, sodium amide, potassium amide, sodium hydride, lithium hydride, sodium triphenyl methide, potassium triphenyl methide, lithium triphenyl methide and sodium naphthalenide, and an aprotic solvent which is not reactive with said base or said norcamphor, and heating said mixture to a temperature of from about 50° C. to about 130° C. for from about 1 hour to about 8 hours to form the enolate of 3-methyl norcamphor; and
   (6) reacting the mixture from step 5, containing the enolate of 3-methylnorcamphor, with tri(2-methyl-5-bromopentyl) borate at a temperature of from about 50° to about 150° C. for about 24 hours to 120 hours and subsequently hydrolyzing the reaction product thereof to obtain 3-endo-methyl-3- exo-(4'-methyl-5'-hydroxypentyl) norcamphor having the formula

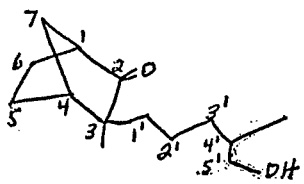

2. The process of claim 1 wherein in Step 1, 2-methyl-4-pentenol is esterified with acetic anhydride in a solvent selected from the group consisting of pyridine, collidine, trimethylamine and triethylamine.

3. The process of claim 2 wherein Step 1 is run in an oxygen-free, inert atmosphere at temperatures ranging from 0° C. to 50° C.

4. The process of claim 1 wherein in Step 2 the ester of Step 1 is dissolved in an aprotic solvent which comprises from about 20% to about 99% of the reaction mixture of Step 2.

5. The process of claim 4 wherein in Step 2 the hydrobromination reaction is performed at temperatures ranging from —30° C. to 45° C.

6. The process of claim 5 wherein in Step 2 the hydrobromination reaction is performed at temperatures ranging from —10° C. to 20° C.

7. The process of claim 5 wherein in Step 3 the reducing agent is lithium aluminum hydride modified with aluminum chloride in a molar ratio of lithium aluminum hydride to aluminum chloride of from about 0.9:1 to about 1:0.9 and wherein the solvent comprises from about 75% to about 98% of the reaction mixture of Step 3.

8. The process of claim 1 wherein the azeotropic solvent utilized in Step 4 comprises from about 20% to about 99% by weight of the reaction mixture.

9. The process of claim 8 wherein the azeotropic solvent utilized in Step 4 is selected from the group consisting of benzene, toluene and xylene.

10. The process of claim 9 wherein in Step 4, boric acid is utilized in a molar ratio of 2-methyl-5-bromopentanol to boric acid of about 3:1.

11. The process of claim 9 wherein in Step 4, boric anhydride is utilized in a molar ratio of 2-methyl-5-bromopentanol to boric anhydride of about 6:1.

12. The process of claim 8 wherein in Step 5, in the mixture comprising base, 3-methylnorcamphor and solvent the base and 3-methylnorcamphor are in a ratio of about 1:1, and from about 75% to about 95% by weight of said mixture is solvent.

13. The process of claim 12 wherein, in Step 5, the strong base is selected from the group consisting of sodium amide and sodium hydride.

14. The process of claim 12 wherein, in Step 5, the tri-(2-methyl - 5 - bromopentyl)borate is reacted with the enolate of 3-methylnorcamphor in a molar ratio of the enolate of 3-methylnorcamphor to tri(2-methyl-5-bromopentyl)borate of about 3:1.

References Cited

Noller, "Chemistry of Organic Compounds," 3rd edition, 1965 (I) pp. 183–184, (II) pp. 197–198, (III) pp. 152–153.

Morrison et al., " Organic Chemistry," 1962, pp. 135–136.

Corey et al., Jour. Am. Chem. Soc., vol. 84, pp. 2611–2641 [1962].

BERNARD HELFIN, Primary Examiner

N. P. MORGENSTERN, Assistant Examiner

U.S. Cl. X.R.

252—117, 132, 522; 260—462A, 486R, 487, 488B, 587, 633

UNITED STATES PATENT OFFICE
CERTIFICATE OF CORRECTION

Patent No. 3,580,953         Dated May 25, 1971

Inventor(s) Wayne I. Fanta and William F. Erman

It is certified that error appears in the above-identified patent and that said Letters Patent are hereby corrected as shown below:

Column 2, lines 55-61, the portion of the formula reading  should read 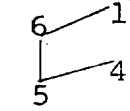 and the portion reading 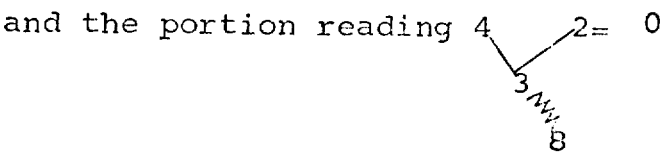 should read 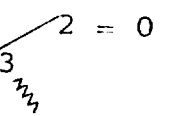 ; lines 65-72, the portion of the formula reading 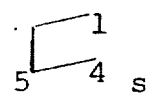 should read 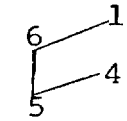 and the portion reading 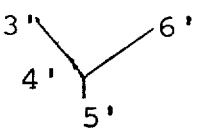 should read 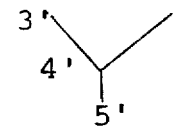

Column 5 lines 11-12 delete "for use herein is diethyl ether. The solvent is utilized ethane or bis(2-methoxyethyl) - ether." and insert therefor -- , e.g. diethyl ether, tetrahydrofuran, 1,2 dimethoxyethane or bis(2-methoxyethyl)-ether.---.

Column 8, lines 70-71, delete "-$CHCH_2$-, OAc), 9.11 (3H, doublet, J=6 Hz., $CHCH_3$) and insert therefor -- (2H, $CHC\underline{H}_2$), 6.05-6.36 (2H, $C\underline{H}_2$ OAc), 8.08 (6H, -$C\underline{H}C\underline{H}_2$-, OAc), 9.11 (3H, doublet, J=6 Hz, $CH\underline{C}H_3$) --.

Signed and sealed this 2nd day of November 1971.

(SEAL)
Attest:

EDWARD M. FLETCHER, JR.      ROBERT GOTTSCHALK
Attesting Officer             Acting Commissioner of Patents